Oct. 13, 1942.  L. HOLLAND-LETZ  2,298,622
UNIFORM STEP PRODUCING THERMOSTAT FOR ENERGIZING
STEP TEMPERATURE REGULATOR SYSTEMS
Filed May 31, 1940  2 Sheets-Sheet 1
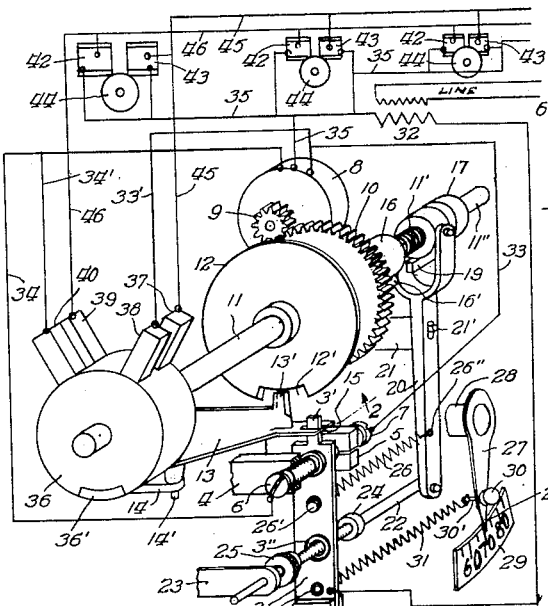
INVENTOR
Ludwig Holland-Letz

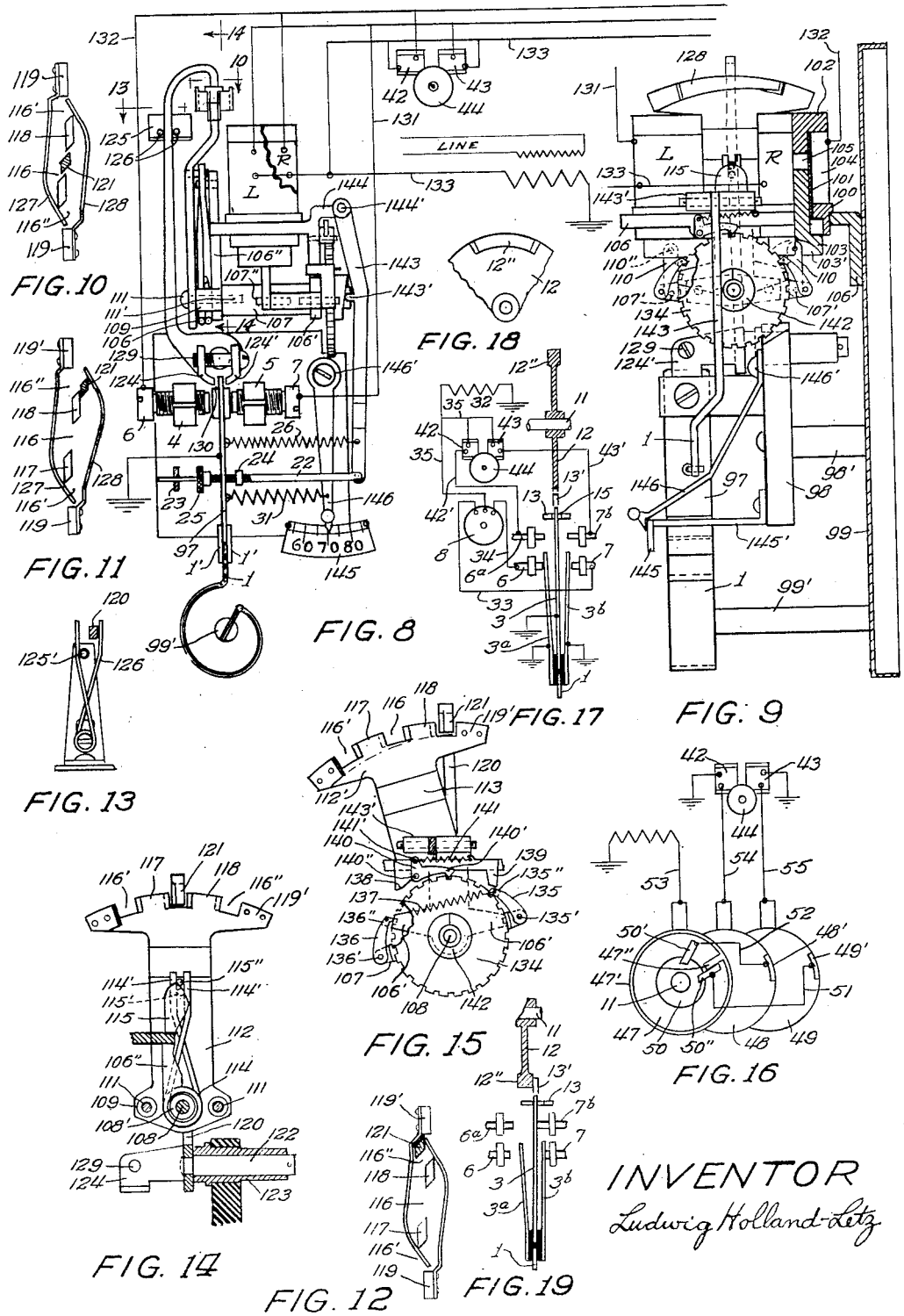

Patented Oct. 13, 1942

2,298,622

UNITED STATES PATENT OFFICE 2,298,622

UNIFORM STEP PRODUCING THERMOSTAT FOR ENERGIZING STEP TEMPERATURE REGULATOR SYSTEMS

Ludwig Holland-Letz, Crown Point, Ind.

Application May 31, 1940, Serial No. 338,174

22 Claims. (Cl. 236—76)

This invention relates to automatic thermostats for temperature regulators, particularly to such that regulate by selecting any one of a series of uniform spaced positions within a predetermined limit of movement and keeping this limit of regulating movement within a predetermined temperature range, stopping at such regulating positions as are commensurate with the temperature requirements and changing to new positions as the temperature changes; thus, automatically keeping the temperature within the predetermined range.

The prime object of this invention provides for a compact self-contained uniform step producing thermostat that will produce a series of uniform steps and simultaneously transmit an intermittent electrical circuit for energizing one or more remotely located switch-less step motor regulators independent of any other power unit operating a switch mechanism for that purpose.

Another object of this invention provides for a thermostat whereby automatic uniform step temperature regulation may be provided for a low initial equipment cost accomplished by reducing the number of electrical switches and motors; and their cost. The thermostat containing all the necessary switch mechanism.

A further object of this invention provides for a self-contained uniform step producing thermostat operated on a low voltage circuit and using the bi-metal thermal switch interposing a pair of contacts which provides the only necessary switch whereby simple remotely located switch-less temperature regulators may be operated; these step motor regulators may be regulating; draft and damper for heating plants, valves for radiators or liquid fuel burners, et cetera.

A further object of this invention provides for self-contained uniform step producing thermostat operating on line voltage in which a mercury switch or any other sensitive line voltage switch may operate one or more remotely located switch-less step motor regulators directly from the one thermostat control.

Another object of this invention provides for a step power thermostat control in which the thermal circuit is locked while the step is in progress so as to insure complete step and when the step has been completed the thermal circuit is broken so as to produce definite steps and simultaneously transmit an intermittent electrical current for energizing remotely located switch-less step motor regulators of the reciprocating or oscillating type for de-energizing electro-magnets for return of the attracted member without the use of other switch mechanism.

My pending patent applications, Serial No. 148,091, filed June 14, 1937, issued July 2, 1940, Patent No. 2,206,566; Serial No. 325,158, filed March 21, 1940; and Serial No. 325,157, filed March 21, 1940, these are all various types of automatic uniform step temperature regulators, each having important significant features differentiating from one another; this, the current invention also differs, in that no separate unit containing power operated switch mechanism is necessary; i. e., for operating or energizing the thermostat contact separating step motor which may be in circuit with other step motor regulators; but in this invention, the thermostat contains all the switch mechanism necessary for operating step motor regulators; including power, for operating the switch mechanism for operating step motor regulators, also operates thermal contact separating movement for forming steps, which also keeps the thermal contact pressed together while the step is in progress, which also controls the travel limit, and other important features not disclosed in my other mentioned applications.

It is obvious that the responsive or thermal element shown, and will hereinafter be described in this current invention, can be provided with most any kind of responsive element, i. e., sensitive to moisture, or proportioning any other medium, by the use of such respective responsive element; temperature has been shown and generally referred to so as to avoid confusion and simplify description.

To describe my invention more fully reference will be made to the accompanying drawings, in which—

Figure 1 of the drawings is a dilated perspective diagram view of a low voltage step control thermostat regulator energizer as shown using a bi-metal thermal member interposing a pair of contacts in circuit with a reversing motor operating a switch locking disc and a current distributor, the latter is shown in circuit with a plurality of ratchet step motors.

Figure 2 of the drawings is a plan view looking upward on the switch locking arm and the disc shown partially in dotted lines of the neutral opening diagonal edges, viewed at section 2—2.

Figure 3 is a plan partially broken away view of the screw thread operated thermal responsive contact separation and limit stop control of Figure 1.

Figure 4 is a dilated partial perspective view of the locking disc and current distributor for energizing annular type step motor driven regulators as shown in my application Serial No. 325,156 filed Mar. 21, 1940, this distributor may be substituted for the one shown in the thermostat control of Figure 1 which is shown energizing step motor driven regulators.

Figure 5 is a plan diagram view of a line voltage thermostat uniform step control, using a mercury switch and fitted with travel limit control. It is thermally controlled by a gas bellows.

Figure 6 is a partial plan view of thermostat control of Figure 5 showing the uniform step in progress, the switch is shown in a tilted position as locked by the disc, Figure 7 is a partial cross section at 7—7 of the indexing lock disc and through the mercury switch, in the neutral position as in Figure 5.

Figure 8 is a front plan view of a thermostat using a bi-metal responsive member and operated by a solenoid ratchet step motor. After a uniform step starts in this thermostat the thermal responsive member contact is firmly held together until the step is completed, then the switch is forced open, thereby the circuit is broken and allowing the solenoid plungers to return to their neutral position and then the thermal responsive member is again free to respond to the awaiting signal.

Figure 9 is a side elevation of Figure 8 with a partial cross section through one of the solenoids.

Figure 10 is a periphery view of the switch locking quadrant showing the switch arm finger in neutral position and the leaf springs, viewed at section 10—10.

Figure 11 is the same periphery view as Figure 10 as the finger has opened the leaf spring after the step is near complete, Figure 12 is the same periphery view as Figure 10 with the step completed, the finger moved to left and forced the thermal responsive contact open so that the solenoids can return to neutral position.

Figure 13 is a partial view of the double acting torsional switch arm spring for holding the firmly sprung arm in the thermal responsive contacts open position, section at 13—13.

Figure 14 is a partial cross section at 6 of the switch locking quadrant shown held in the neutral position through the double acting torsional spring, section at 14—14.

Figure 15 is a partial view of the switch locking quadrant shown in the position after the step has been completed ready for the return of the solenoid plunger. The ratchet wheel and propelling pawls are shown, including the lock pawl. The solenoids and other parts have been removed.

Figure 16 is a diagram view of a distributor switch which may be used with the thermostat of Figure 1 in place of the distributor shown, both of which serve for energizing reciprocating step motor regulators, independent of the thermal responsive circuit, the distributor having a friction held member.

Figure 17 is a diagram view of a triple blade thermal member which may be used for Figure 1 thermostat, the two additional blades yield to permit two additional terminals to be used for energizing reciprocating step motor regulators and replacing the distributor switch shown.

Figure 18 is a partial side view of the indexing disc segmental cam raise as is used in Figure 17.

Figure 19 is the same diagram view shown in Figure 17 and is here shown in the position of energizing the step motors.

Referring to the drawings Figures 1, 2 and 3 show a thermostat containing a complete uniform step producing power control for operating on a low voltage electric circuit from a transformer, it is controlled and operated by one switch, this switch as here shown is the responsive bi-metal two pole thermal switch; this thermal switch is firmly held in contact while steps are in progress and at the same time the spring tension movement for separating the thermal contact is changed, it can take effect only after a step has been completed; a distributor for energizing any number of reciprocating ratchet step motor regulators is shown operated in this thermostat. Other forms of regulator energizing switches will be described later.

The thermal responsive element bi-metal coil 1 is secured to a suitable base, not shown, by a post 2, a thermal blade 3 is secured to the bi-metal coil through non-conducting material 1' to retard the foreign heat, resulting from current arcing and current flow, from impairing its natural sensitive controlling features, a pair of terminal posts 4 and 5 suitably secured insulated to the base, these posts are provided with terminal screws 6 and 7 respectively in parallel alignment opposedly co-operating with the thermal blade 3 near upper end.

A small reversing motor 8 is mounted in a suitable manner in the thermostat, power take-off pinion 9 is secured to motor and gear 10 is mounted on the shaft 11, a narrow circular indexing disc 12 is mounted on the shaft adjacent the gear 10, this disc is provided with a segmental shaped opening (neutral position) 12' formed in the disc periphery, this neutral position opening is provided with symmetrically formed opposite diagonal edges, as shown in Figure 2, a switch locking arm 13 capable of swinging in a horizontal plane upon pin 14' between the forked bracket 14, the latter partially shown, this arm is provided with an upwardly projecting finger 13', this finger having a cross section of opposed diagonally shaped edges to conform with the edges of the neutral opening 12' so that when the indexing disc 12 is rotated clockwise the switch locking arm will swing to the right and vice versa to the left, the outer end of the switch locking arm is provided with a slot 15, the upper end of the thermal blade 3 is provided with extension finger 3' engaging the slot 15 of the switch locking arm for the purpose of; when the finger 13' is riding the side of the indexing disc as it is rotated in either direction, it will press a firm contact between the thermal blade 3 and either of the terminal screws 6 or 7; thereby, obviously eliminating all possible vibration when contact is established, and therefore is able to carry a very heavy load when so locked, without arcing.

On the right hand end of the shaft a threaded extension 11' is provided with an inner travel limit collar 16 which is secured to the shaft, another stop collar 17 is provided for the near outer end of the shaft and also secured to the shaft, the shaft between the two collars 16 and 17 being threaded for supporting an internally threaded follower travel limit collar 18, this collar is provided with a pair of rib noses 19 projecting equal distance from both sides to a length slightly less than the thread pitch of the shaft 11' so that when the rotating limit of the shaft in either direction is reached the nose 19 will strike and stop against the lug 16' of collar 16 or against lug nose 17' of collar 17 in opposite direction and stop further rotation without binding, for return movement, as is shown in Figure 3 at 17' and 19; it is obvious therefore that the number of revolutions that the shaft 11 is limited to, will depend upon the number thread leads lying between the collars 18 and 16. The collar 18 is further provided with pins 18' radially opposite each other and at right angles to lug 19 for freely hinging the forked portion of the travel limit arm 20 which is fulcrumed on pin 21' projecting from the post 21 in the slotted hole 20'; the post is suitably mounted on the base; the lower end of the travel limit arm hingedly supports a right angle bent portion of a travel limit rod 22, this rod passes freely through a hole 3" in the thermal blade 3 provided with an insulating bushing, the outer end of the rod having a reduced portion for sliding support in the bracket 23, this bracket is mounted on base to the left of the thermal member adjacent the hole 3", this rod is threaded about half way back from the reduced end upon which the small round stop collar 24 snugly fitting the thread and located to the right close to the thermal blade and a knurled adjusting nut 25 to the left of the blade; these two stops oppose the movement of the thermal blade and are so adjusted that when the shaft 11 is rotated at either of the two extreme limit positions either adjusting nut 25 or stop collar 24 should just touch the thermal blade and prevent its contact with the respective terminals 6 or 7 but not enough to cause it to force the blade too far and cause a contact with the opposite terminal screw; near the lower end of the travel limit arm a light tension spring 26 is attached in hole 26" and the other end in an insulated manner in 26' hole in blade 3; this spring is of a certain pulling strength so as to compensate for a desired temperature range that should be contained in the total travel limits, this may be 2 degrees for 10 steps, or 1½ degrees for 24 steps, or 5 degrees for 4 steps, or whatever may be desired.

In order to provide temperature change means for changing the desired temperature, a simple adjusting lever 27 has been provided which is frictionally pivoted upon post 28 secured to the base, the outer end of the lever is provided with a pointer 27' for indicating the desired temperature shown on the segment dial 29 which is secured to the base in a suitable manner; near the outer end of the lever, a knob 30 is secured and extending through with a pin 30' to which the tension spring 31 is attached, the outer end of the tension spring is secured to the thermal blade 3 in hole 31' with insulation, this tension spring should be of such strength so as to replace a temperature range of 20 or 30 degrees as shown on the dial. This temperature adjustment just described is shown for simple illustrative purpose only, various conventional adjustment means may be substituted in its stead.

All the major parts of this step producing thermostat regulator energizer has above been described, as above stated the motor 8 is a small reversing type and is in circuit with the thermal terminal screws 6 and 7 through leads 33 and 34 respectively, these form a circuit for motor reverse operation, the electric current being A. C. of low voltage and is through the transformer 32 hence through lead 35 and the lead 41 from transformer to thermal blade 3 will complete the circuit for the motor; now if the thermal element made a slight contact at terminal screw 7, will cause a circuit through lead 33 to the motor then through 35 back to the transformer 32, this will cause the motor to rotate the shaft and the indexing disc clockwise and cause the switch locking arm to move to the right and the slot 15, force a firm contact of the thermal blade 3 to be made against the terminal screw 7 and remain there until the one revolution of the indexing disc 12 has been completed, in the meantime the threaded shaft 11 has revolved the threaded portion 11', which is shown having right hand threads, has moved the travel limit collar 18 to the right and swing the arm 20 lower end to the left and reduced the tension of the spring 26 and therefore after completion of the step there will be no more contact at the terminal screw 7, this will cause a break in the circuit when the disc arrives at the neutral position 12' and the motor will come to a stop; had a very heavy pressure been made at the contact screw 7 the motor would not have stopped but it would continue on its journey of making steps until the pressure has been relieved or it is stopped from making any further progress due to the collar 24 on the rod 22 engaging the thermal blade 3 and force a thermal contact opening as soon as the step is complete, when at the neutral disc position. For the reverse direction the same operation procedure is true as that just described, when circuit is made at contact screw 6 through lead 34.

As above mentioned, this uniform step thermostat switch control will energize any number of switch-less power operated regulators, independent from any other outside switching source; four different step motor energizing distributor switches have been shown that may be used for this thermostat; the load capacity, the silence of step motor operation and their cost will largely depend upon the type of distributor switch best suited; i. e., a large single step motor regulator, or a plurality of those or smaller; either reciprocating or oscillating, or the annular type, step motor driven regulators.

The distributor switch shown in Figure 1 is shown energizing three reciprocating step motor valve regulators controlling the supply flow of steam or hot water to radiators, liquid fuel or gas to heaters, etc., used for maintaining uniform or for changing the temperature of an enclosure space in which the above described thermostat control is suitably located.

Mounted on the shaft 11 to the left of the indexing disc 12 is a distributor rotor 36 made of non-conducting material, a segment 36' of conducting material and extending across the full width of the distributor rotor embedded in and secured thereto forming a smooth periphery; a pair of brushes 37 and 38 mounted, insulatingly separated, set side by side upon the rotor periphery to the right of the vertical center-line and aligned along the shaft axis; a second pair of brushes 39 and 40 similarly mounted to the left of the vertical center-line and suitably secured resiliently in the thermostat; the two pair of brushes should be angularly separated with their inner opposing edges by a space somewhat wider than the width of segment 36'; a circuit is made between pairs of brushes when the segment bar 36' passes under these brushes, brush 40 is in circuit lead 34' to through lead 34 hence to thermal contact screw 6; and brush 38 is in circuit with thermal contact 7 through leads 33 and 33'; brush 39 is in circuit with solenoid coil 42 through lead 46, and brush 37 is in circuit with solenoid coil 43 through lead 45; the circuit from the solenoid coils to the transformer is through lead 35, lead 41 makes the circuit from the thermal blade 3 to the other side of the transformer. As above mentioned, the springs 26, 31 and the rod 22 are electrically insulated at the thermal blade 3.

To energize the solenoid or other switch-less oscillating or reciprocating step motors, it is necessary for the circuit to be broken at the completion of the driving stroke to enable the return of the plungers or armatures. The distributor just described provides for this, by producing an intermittent impulse circuit, when the segment bar 36' passes under the brushes this will cause an electrical impulse to be made in the circuit parallel to the thermal responsive contact switch to motor circuits; the novel feature of this step producing thermostat of holding the thermal contact firmly together provides for carrying a comparatively large amperage, therefore a number of small or one large solenoid or electro-magnet reciprocating step motor regulator may be operated with the ordinary size thermal member with this type of a distributor switch; for each revolution of the indexing disc 12, the distributor disc 36 will cause an energizing impulse in either of the solenoids 42 or 43 to be made when the thermal responsive element contact terminals 6 or 7 respectively have caused the motor 8 to rotate the disc 12 one revolution in either direction, therefore it is obvious that all the reciprocating step motors, assuming a step in either direction is made for each impulse from the distributor switch, will keep in unison step, back and forth, with this thermostat step producing power control. It will be noticed that the current that passes through the terminals, that the heat generated from arcing and by the current load is retarded from entering the bi-metal coil 1 by separating the two with non-conducting material; thus, when heavy loads are carried by these thermal contacts the true thermal position is much less effected and close temperature regulation is made more steady.

To summarize this thermostat control of Figures 1, 2 and 3, just described; this thermostat is a complete self-contained control, for controlling temperature, humidity, etc., it includes the motor, the responsive element, operating mechanism for holding the responsive element securely contacted after it has started the motor on the journey of making a step, during this step movement the responsive element position is slightly changed by changing the spring tension acting on the responsive element relative position to separate contact with cooperating switch parts, and when the step is complete, if sufficient movement has ensued the contact will separate and the motor will stop at completion of any step, or if insufficient movement, the motor will journey on in making more steps, a travel limit control as described will stop the responsive element from making further contact when either of its opposite predetermined limits is reached, this limit may be adjusted to different limits if desired; all that now has been briefly described is contained in this single unit thermostat, including also a distributor switch for operating or energizing step motor operated regulators for valves, etc., the distributor switch shown is for energizing reciprocating step motors. The motor 8 and the distributor switch are in series with the responsive element contact.

Referring to Figure 16, is a diagram view of a distributor switch for energizing reciprocating type step motor driven regulators operating through a circuit independent of the responsive switch element contacts, this distributor may be substituted for the one shown and described in Figure 1, it is able to carry heavier regulator loads because it does not depend upon the responsive contact circuit that the above described distributor switch in Figure 1 does. This distributor switch consists of a cylindrical rotor member freely fitting the shaft, and is made up of disc sections, 47, 48 and 49, each of a suitable thickness to provide a periphery face to accommodate a brush, these sections are made of nonconducting material, sections 48 and 49 are provided with a conductor segment 48' and 49' securely embedded in their periphery forming a smooth surface, section 47 is provided with a conductor band around its periphery of a diameter equal to 48 and 49, the band 47' projects over the side forming a dish, the band is provided with a radially inward projecting lug 47'', these three sections are assembled rigidly side by side together but separated from one other through insulation thereby forming a single unit distributor rotor; this rotor is mounted on the shaft 11 to revolve freely, a collar 50 made of nonconducting material and having an opposing pair of arms 50' and 50'' extending radially therefrom and made of conducting material, these arms are angularly spaced somewhat wider than the thickness of lug 47'' and are secured in the collar and act as drivers for the distributor rotor, driving against lug 47'' contacting parallel thereto, thereby forming circuit on the driving side only, this collar 50 is secured to the shaft against and in the dish section 47 part of the assembled distributor rotor, three brushes 53, 54 and 55 resting upon the sections 47, 48 and 49 respectively are resiliently suitably mounted in the thermostat so that the segmental conductors align angularly opposite the brushes when the disc 12 is located in the neutral position; the drive arm 50' through a flexible lead 52 within the assembled rotor makes circuit to segment 48', the drive arm 50'' is connected through a flexible lead 51 to segment 49'; brush and lead 53 make circuit from the transformer to band 47' hence through lug 47'' through 50'' drive arm and lead 51 to segment 49' and then through brush and lead 55 to solenoid 43 of the step motor regulator, which is grounded, when rotated by the shaft this will cause an impulse in solenoid 43 and a step in step motor rotor 44 will be made when the indexing disc 12 is rotated one step (revolution) in the counter-clockwise direction; when the thermostat step producing indexing disc 12 is rotated in the clockwise direction, friction from the brushes resting on the distributor rotor will hold the rotor so that the drive arm 50' will drive the lug 47'' and through the lead 52 to 48' will contact brush and lead 54 to solenoid 42 of the step motor regulator, which is grounded, this will cause a step to be made in the opposite direction by the step motor. It is obvious that if this type of a distributor is used the thermal responsive member and one side of the transformer may be grounded and thereby avoid the extra insulating of thermal responsive blade parts attached thereto. It will further be seen that the thermal responsive member when this step producing thermostat is fitted with the distributor just described it is independent of the reciprocating step motor regulator loads and therefore will be able to carry very heavy loads without effecting the bi-metal responsive sensitivity for close study temperature regulation.

Briefly summarizing the Figure 16 distributor switch description, the circuit through the distributor is parallel to the responsive element. As above stated, it is for energizing reciprocating step motor driven regulators in which opposing solenoids or electro-magnets are used for propelling ratchet wheel oppositely acting pawls, so that one solenoid will rotate the ratchet wheel in one direction, and the other in the opposite direction; this distributor is freely supported on the shaft and frictionally resisted by the collector brushes, the distributor is driven by the motor 8 by a single contact arm interposingly engaging a pair of contacts, so that when the motor 8 moves in one direction, contact is made to energize one solenoid and the step motor ratchet wheel will rotate in one direction, and on reversal of the motor 8 the opposite solenoid is energized by the opposite contact and the step motor ratchet wheel will move a step in the opposite direction, these step motors may be operating regulators, etc.

The rotating type of distributor switch for operating the reciprocating step motor regulators are very simple, and volumetrically considered they will carry very heavy loads, in a small size unit, suitable for this thermostat; however, when very light regulator loads are to be controlled and attained at very low equipment cost; Figures 17, 18 and 19 show in diagram views, a simple multi-blade thermal switching circuit for energizing a reciprocating step motor which is independent of the thermal circuit by using an additional pair of thermal blades and contacts the use of a distributor switch is avoided. The thermal blade 3 as is shown in Figure 1 is provided with an additional pair of blades 3a and 3b and insulatingly secured to bi-metal coil 1, these blades co-operate interposingly with the thermal terminal screws 6 and 7 respectively; a pair of opposing terminal screws 6a and 7b located above the latter co-operating with the inner blade 3 and through leads 42' and 43' connect to solenoids 42 and 43 respectively, and 35 leads to the transformer, which is grounded; thermal members 3, 3a and 3b are grounded and insulated from one other. The blade 3a through terminal screw 6 connects through lead 34 to motor 8 hence through lead 35 to transformer; the reverse operating direction is from blade 3b through terminal screw 7 through lead 33 to motor 8 hence through lead 35 to transformer. The indexing disc 12 has a raised segment 12'' projecting from both sides and is located diametrically opposite the neutral opening 12', as the motor 8 receives a signal; say, from terminal screw 7, the disc 12 rotates clockwise and forces the finger 13' of arm 13 to the right riding the side of the disc causing pressure between 3b and screw 7 and when the raised segment reaches the finger 13' an additional swing to the arm 13 will result while the segment is passing the finger and cause the blade 3b to be forced to recede as the blade 3 contacts with the terminal screw 7b and makes circuit to the solenoid 43, causing a short impulse while the segment is passing the finger 13'; for the opposite direction is through the other circuit and need no further explaining.

It is obvious that various other arrangements of multiple thermal blades and contacts, yielding terminals, etc., may be made for causing a second circuit through a second further movement of a member; the one shown and just described is simple and illustrative.

Briefly describing the multiple blade responsive element just described for use with the step producing thermostat control of Figure 1 instead of the one shown, the circuit for energizing the step motor driven regulators is parallel to the responsive element and as above stated it may be desirous where low initial cost is important, the two blades are in circuit with the motor 8 for reverse operation, and the center blade makes contact during each step when the raised portion of the disc 12 passes the lock means and causes an impulse for energizing either of a pair of opposed solenoids of reciprocating step motor operated regulators, as is above fully described.

There is considerable difficulty involved in making the reciprocating or oscillating step motors to operate silently; the annular type step motor, one in which a rotor revolves in a stator field, it is very silent; therefore these may be preferred to the reciprocating type. In Figure 4, I have shown a distributor that may be used in the above described thermostat whereby such step motor equipped regulators may be energized in place of the solenoid type: this distributor and annular type step motor has been shown and described in the above mentioned patent applications including Serial No. 325,156 filed March 21, 1940, it will therefore be described, now only briefly.

This distributor shown in Figure 4 will make three contacts for each revolution of the shaft 11, therefore it will revolve but one third of a turn for each step of the indexing disc which is now numbered 56, it is provided with three neutral positions of opening 12' of exactly the same inclining edges; mounted upon and freely fitting the shaft 11 is a distributor disc 57 made of insulating material, embedded conductor bars 62 and 63 being flush with the periphery of the disc, segments 60 and 61 respectively are an integral part of the bars the latter being spaced at an angular position of 120 degrees with the end of the segments interposing the bars, the opposing ends of the segments forming an opening somewhat wider than the thickness of the driving contact arm 59 which extends radially from collar 58, both made of conducting material, which is secured to the shaft against the distributor disc 57 resting against a suitable collar, not shown, so that the disc can rotate freely, three brushes D, E and F are mounted in the thermostat in a suitable manner so that the brushes rest resiliently on the distributor disc at a 120 degree angular spacing in a position so that the drive arm 59 aligns with a brush when the finger 13' sets in the neutral position of the disc 56. The collar 58 forms a ground circuit through the shaft.

An external rotor step motor having a stator 64 provided with pole coils A, B and C disposed around its axis in which a shaft rotates a rotor 65 in steps of a fractional turn is shown having 4 depending arms 65' and 65'', traversing the stator magnetic field, this motor, with the type of distributor shown will make $\frac{1}{12}$ of a turn for each impulse received by a stator coil, only one coil is energized for each step, the circuit is as follows, brush D through lead 66 will energize stator coil A, brush E through lead 67 will energize coil B, and brush F through lead 68 will energize coil C, the other side of the circuit is made through lead 69 to the transformer 70. The drive arm 59 is shown contacting segment 61 an integral part of bar 63; assuming that the indexing disc 56 is starting a step in the counterclockwise direction, this bar 63 will travel under the brush F and energize stator coil C and attract arms 65' of the rotor 65 and move it 1/12 of a revolution counterclockwise, and if another step is made by the disc 56 in the same direction the bar 63 will cause an impulse through brush D through lead 66 to coil A and another step will be made in the same direction; the next brush E, lead 67 to coil B and the rotor arm 65' will be at coil B; now if the disc 56 is to move in the opposite or clockwise direction, the distributor drive arm will contact segment 60 and it will pass under D and energize coil A and the step motor will move one step back or clockwise; with the use of the straddle contact and the frictionally held distributor disc 57 a different stator pole is selected on reversal of movement, thereby perfect step is kept between the thermostat step producing power control and the step motor regulators. It will also be seen that with the use of this form of a distributor switch that this circuit is independent of the thermal circuit same as in the distributor of Figure 16. Any number of such step motor regulator may be used in this circuit.

The annular type step motor distributor switch of Figure 4, just described, for use with the thermostat control of Figure 1, instead of that shown, operates in a circuit parallel to and independent of the responsive element contact and therefore has capacity for energizing any number of such annular type step motor operated regulators. This step motor operates silently and also due to its volumetric efficiency is therefore the referred form of step motor operated regulator, these will however require three lead wires while the reciprocating type only two, and both must have an additional return lead or ground circuit. Here as with Figure 16 distributor, a selector is used for selecting either of a pair of contacts when the motor direction is reversed.

In oil burner, coal stokers and air conditioners, which all require automatic regulation; line voltage regulating devices have become more popular; in the diagram view of Figures 5, 6 and 7 I show the same thermostat switch control step producing power control above described, but instead of a bi-metal thermal member it is shown controlling a single pole double throw mercury switch; this switch is actuated through a thermal responsive gas expansion bellows 71 secured to a bracket 72 by screw threads and nut 73, the bracket is secured to the thermostat base in a suitable manner, the outer end of the bellows 71 is provided with the slotted head 74 for straddling the thermal lever 75 and secured with pin 74', the lever is hinged to base on pin 75', the upper end of the lever 75 is provided with stop pins 76 and 76' for limiting the lateral rock of the lever to the proper tilt of the mercury switch; these parts just described are very similar to that shown in my above mentioned pending patent application Serial No. 325,157, filed March 21, 1940.

The mercury switch 77 is clamped in and carried by a yoke 78, this yoke is hinged in brackets 79 and 80' by pin 81, the brackets are secured to the thermostat base 80, very close to and above the hinge pin 81 is a small hole 82' for receiving the link 82 and a hole 82'' for connecting the thermal lever with the switch yoke, the holes fitting the link very close without play but free to oscillate, it should be said here that the switch should be as near balanced as possible so that the slightest force of the lever will cause the switch to tilt.

The motor 8 and the shaft 11 parts are all the same as in Figure 1, the collar 18 is provided with pin 18' which freely hinges the fork of the travel limit arm 83 which is provided with slotted hole 20' for pin 21' of post 21 as a fulcrum point, the lower end of the arm is offset to clear the switch and come in line with the lever 75, a travel limit adjustment control rod 84 having a right angle bent portion fitting a hole 84' in the lever 75 about half way up from the hinge, the other end of the rod having a short reduced portion continuing with a long threaded portion, the threaded portion freely passing through a slotted hole 84'' in the lower end of the travel limit arm 83, a bracket 85 mounted on the base, the bracket having a hole aligned with the slotted holes 84' and 84'', this bracket hole slidingly supports the reduced end of the rod 84 so as to prevent the threads from dragging on the arm 83 and cause unnecessary friction, a limit stop 87 for limiting the clockwise rock of lever 75 when the collars 18 and 17 meet, and a knurled adjusting nut 86 is positioned so as to stop the counterclockwise movement of the lever 75 when the collar 18 and 16 meet; the action of this travel limit control is precisely as that explained for Figure 1 and therefore will not be repeated, the lever 75 and arm 83 are provided with holes 88' and 88'' located in parallel alignment with rod 84 and just above the latter for attaching tension spring 88, this spring compensates for a small temperature range through which the total number of step are confined as explained for Figure 1 thermostat, a temperature adjustment control graduated quadrant 72' a fixed part of bracket 72, a pointer 89 pivoted at 89' on the bracket, a slotted hole 90' fitting a pin in a temperature adjusting screw 90, a tension spring 91 secured to the latter and the other end of which attaches in hole 91' in the lever 75, a knurled nut 92 serves as an adjustment for varying the normal resting position of the point indicating the temperature desired.

The switch yoke upper end is provided with a lock pin 78' which co-operates with slot 15 of the switch locking arm 13, the latter is hingedly swung in a horizontal plane on pin 14' of bracket 14 secured to the base, the indexing disc 12 serves for holding the mercury switch locked by the finger 13' riding the side of the disc, thus swinging the arm 13 and causing slot 15 to engage pin 78'. When the expansion bellows 71 moves lever 75 and through link 82 tilts the mercury switch (the switch is shown having a pair of terminals at each end, which is the common well known switch), the mercury will flow and cause a circuit to be made between a pair of terminals, as is shown in Figure 6, this will make circuit between lines 93 and 95 to motor 8 and then through line 96 complete the circuit, and 95 and 94 is the other circuit to the motor for reverse rotation when the switch is tilted in the counterclockwise position; assuming the switch is tilted as in Figure 6, the motor will cause the disc 12 to be rotated in the clockwise position and cause the disc 12 to hold the switch locked for one revolution until the neutral opening 12' again reaches finger 13', this has caused the threaded shaft 11 to push the collar 18 one thread to the right and the lower end of the arm 83 to the left and slacken the tension of the spring 88, this will allow the thermal lever 75 to pull the switch back or if the spring relief has been insufficient, then another step will follow, until the limit has been reached and the arm 88 pushes the levers 75 back by force when the step is complete, the same is true when the opposite limit has been reached. On the left end of the shaft 11, provisions are made for operating any one of the three types of distributor switches above described for Figure 1 thermostat for operating any number of the switch-less step motor regulators above mentioned.

The thermostat control of Figures 5, 6 and 7, just described, summarized, where it is desirable to operate large regulating motors, these are preferably operated directly on the ordinary lighting circuit. This thermostat control is fitted with a mercury switch and actuated by a thermal expansion bellows responsive element arranged to be thereby tilted for operating the motor 8 in the thermostat which in turn operates mechanism for locking the switch the tilted position until the step is complete, during the step the motor has also applied a spring force tending to move the responsive element position towards opening or tilting the switch back into neutral when the switch is unlocked at completion of any step, travel limit stop control is also provided, all the features are as with thermostat control of Figure 1. However, the mercury switch usually operates one or more regulator motors in parallel circuit with motor 8, or, if desired, any of the rotating distributor switches may be used.

The above described uniform step producing thermostats all require an additional switch mechanism other than the responsive element contacts for energizing step motor regulators. In the Figures 8 to 15 of the drawings, I show a thermostat in which reciprocating step motors regulators are energized through the responsive element switch circuit that energizes the step producing reciprocating step motor operated thermostat by the one two pole bi-metal thermal element contact member.

The thermal bi-metal coil member 1 is insulatingly secured to the blade 97, this bi-metal coil is secured to post 99' on base 99, a non-conducting block 98 is secured to a base 99 by the posts 98' in a suitable manner, a pair of terminal posts 4 and 5 threadedly support terminal screws 6 and 7 in their upper ends so as to co-operate with the near upper end of the thermal blade 97'.

A pair of solenoids L and R; each comprising a soft iron head ring 100, these having a counter bored end and a shouldered outside diameter, a non-ferrous metal tube cylinder 101 is secured in the head ring, and a soft iron end piece securely fitting in the tube; a close fitting soft iron piston plunger 103 having a large shouldered head closely fitting into the counter-bored head ring forming a dash-pot cushion so as to retard the up and down stroke action; a right-angle bracket 105 having two large holes aligned in the outwardly extending end at right-angles to the base, the solenoids fitting into these large holes and secured down against their shouldered heads; this bracket having an inverted T shaped depending lug 106' on its right side, its purpose will be explained later, a second depending lug 106" on the bracket to the left side in line with the lug 106', these two lugs lie midway between the two solenoids and at right-angles thereto, on the center line near the lower end of these lugs are provided with a pair of holes for hingedly supporting a solenoid rocker 107 which is provided with a central hole for the purpose on a hinge pin 108, the left side of this rocker is provided with its two opposite ends cut back slightly beyond the solenoid center line and these sides are provided with a pair of small holes and pins in line with the solenoid center lines, each of the plungers is provided with an arcuate slot 103' in the center of their large head ends radially through which a small pin hole 110" at right angles with the slot is provided for hingedly connecting a pair of links 110 with the rocker 107 on pin 107" in the holes 107'.

The rocker 107 is further provided with a pair of tapped holes 111' located in radial alignment with the link holes 107'; a switch control quadrant 112 having a pair of holes 111' at right angles to the center line and equal distance from the center hole for passing hinge pin 108, this quadrant is secured to the rocker separated by the rings 108' and two spacers 109 by screws 111, this switch control quadrant having a three notched circular periphery and is offset inwardly at 113, a short pin 115' is fixedly placed on the vertical center-line just below the offset bend projecting towards the solenoids, a torsional spring 114 having the opposing ends 114' bent so as to cross one other thereby forming a portion of their opposing ends in parallel alignment with each other when sprung and separated to the thickness of pin 115", an upward extending ear 115 adjacent and to the left of solenoids is fixed to bracket 105, this ear is provided with a pin 115' extending toward the quadrant and in central vertical alignment with and just below pin 115" in between the two opposing torsional spring ends so that when the quadrant is swung to the in or out position it will always spring back to this central position, the neutral position.

The quadrant periphery 112' is provided with three notches, the central or neutral 116, the front notch 116', the rear 116", and thereby forming teeth which are diagonally shaped at their ends or edges, the front tooth 117 and the rear 118, the two outer ends 119 and 119' have right angle edges, the two teeth 117 and 118 are staggered out of line of the end teeth, 118 tooth is set to the right so that its left side is in line with the center of the end tooth, and the 117 tooth is set to the left of the center line with the right side on the center line, the teeth 117 and 118 have diagonally shaped edges so that a similar shaped finger 121 extending downward in a return bend from a laterally swinging switch arm 120 will swing thus when the quadrant is swung in or out; this switch arm is hinged on a pivot 122 in a sleeve bearing 123 mounted directly below the quadrant plane center line in the insulated block 98, the quadrant movement will cause the finger on this arm to swing through a staggering path producing lateral movement to the arm, the center of the finger normally rests in the center line position 116 laterally relative to the plane of the quadrant, as shown in Figure 10, the switch arm is springingly held there by a bracket 125 secured to the base, a torsional spring 126 similar to 114' and operatively attached to this bracket 125, the spring opposing ends resting against stop pin 125' and arm 120 thereby holding the switch arm sprung normally central; by viewing the periphery diagrams of Figures 10, 11 and 12, clearly shows the path of lateral movement that the finger takes when the quadrant moves in and out from the neutral position when either of the solenoids are actuated, when the quadrant is moved outward by solenoid R as it is energized, the finger is moved to the right as the diagonal edge of the tooth 118 pushes against the finger and causes it to ride the right side of the tooth 118 and the finger drops off as the end of the tooth is reached, and on the return movement of the quadrant due to the spring 114 the spring 126 and aided by the diagonal edge will force the finger over and against the left side of the tooth past the normal central position of the finger, the quadrant will then have moved back to its neutral position with the finger in notch 116; when the solenoid L is energized the finger will follow the reverse lateral path to the left side of the tooth 117 and on the return movement of the quadrant the finger will be forced over the right side of the tooth 117 and back to the normal position. So as to facilitate the return of the quadrant, a circular leaf spring 127 is fixed to the left side of the end tooth 119' and a similar one 128 is fixed to the right side of the tooth 119, the front end of these springs are bent inward so as to force the finger 121 back off the side of the tooth and beyond the center line of the quadrant on completion of the forward strokes of the quadrant; the inner ends of the leaf springs have a sharp offset portion forming a straight seat of a width equal to the thickness of the finger to the side of the quadrant plane center line, these straight seats act as stops to keep the leaf springs from pushing the finger too far when the quadrant tooth edge leaves the finger at the end of the power stroke of the solenoids, the bent ends also serve to retard the solenoid final power stroke and thereby aids the torsional springs for returning the quadrant.

The lower end of the switch arm 120 is provided with two upwardly extending lugs 124 and 124' formed with opposed inward projecting jaw like edges thereby forming a narrow parallel sided opening 130 aligned directly with the vertical center line of the hinge pin 122 and the finger 121, the jaw like ends extend a short distance beyond the hinge pin 122 so that the lateral swinging movement of the arm finger 121 will cause the opening 130 to move laterally much less and in a reverse direction, the ends 124 and 124' form opening 130 the width of this opening is adjustable by a screw 129 located in the upper end of the lugs.

To describe the object of the switch arm 120 and the switch control quadrant 112, when the switch arm is in the normal position, the opening 130 should be wide enough so that the thermal blade co-operating within is free to move sideways so as to be able to contact with either of the terminal screws 6 or 7 without touching the sides of the opening 130 so that signals are free to register whenever this switch arm is in the normal position; now when a signal is received at terminal screw 6 solenoid R receives an impulse the plunger moves upward and through link 110 swing the rocker 107 counterclockwise and with it the quadrant 112 and the tooth 118 will force the switch arm finger 121 in against the diagonal edge and move the finger to the right and cause it to ride the side of the tooth 118 and at the same time the opening 130 will move to the left and force a firm contact between blade 97 and the terminal screw 6, see Figures 11 and 15, at the end of this power stroke movement the quadrant tooth 118 will have been passed by the finger 121 and the leaf spring 128 has forced the finger through the opening notch 116' and into the corner past the quadrant plane center line and forced a break of the thermal responsive contact because the opening 130 has pulled the blade away from the screw 6, the spring 114 will now bring the quadrant back with the finger riding the left side of the tooth 118 until the finger drops off the end of the side of tooth 118 and the switch arm will come back into its neutral position and the thermal responsive member is again free to respond to the temperature requirement. The other direction of quadrant movement is now easily traced and need not be further explained.

A notched ratchet wheel 134 is rotatably mounted on hinge pin 108, this wheel is provided with a series of equally spaced notches on its periphery face, a pair of opposed propelling pawls 135 and 136 hinged upon the side of raised extensions of the rocker 107 outer ends on pins 135' and 136' respectively, the propelling pawls are each provided with short inward projecting lugs forming a narrow extension of the pawl nose, the inverted T shaped depending lug opposing extensions 106' ends have a true arcuated surface of a diameter slightly larger than the periphery diameter of the notched wheel and these lugs have an angular position so that when the quadrant rests in the neutral position each pawl will rest in its respective engaging tooth, the spacing of the notches of the ratchet wheel is substantially equal to the power stroke 105 of the solenoids, when one of the solenoids, say, the R is raised by the electrical impulse the pawl 135 nose resting in the tooth will move forward and drive the notched wheel counterclockwise the other pawl 136 nose will drag backwards over the notched wheel and the T shaped lug 106' and on the return movement of the solenoids this pawl 136 can not engage a notch of the wheel because the lug 106' is holding it out of engagement and will drop into a different tooth when the neutral position is reached; a tension spring 137 attached to the nose of each pawl in a suitable manner will keep these pawls resiliently riding the notches of the wheel; to prevent the notched ratchet wheel from moving more than one notch at a time for each power stroke of the solenoids, stop lugs 138 and 139 are provided, these stops are fixed to bracket 106 and are positioned just over the pawls 136 and 135 respectively when they are at their extreme forward position, these stops keep the respective pawl down so that the pawl nose resting in the propelling notch can not be forced out by the stored energy of momentum of the fast propelled ratchet wheel assuring only one notch of movement for each impulse of the solenoids. A lock dog 140 pivoted on bracket 106 on pin 140" and having a V shaped nose 140' and provided with ear having a hole 141' directly over the pivot 140", a spring 141 is attached to this ear and is tensioned and attached with the other end to the bracket 106 in a suitable way just ahead and over the V point of the dog, this dog will hold the ratchet notched wheel locked in each step position for either direction.

A side face cam 142 is attached to the notched ratchet wheel, a travel limit control arm 143 is pivoted on a pin 144' fixed to a lug 144 an integral part of bracket 106 located above the center of the ratchet wheel to the front side of the lug, this limit control arm having a bend where it lines with the cam and having a follower nose for resting on the forward cam surface center line the bend is made to bring the nose and the two ends of the arm substantially in a straight line, the near lower end of this arm has an offset outward bend so as to bring the end in line with the thermal blade 97, a hole in the lower end of this arm is provided for hinging a right angle bent round travel limit control rod 22 same as that for the thermostat of Figure 1, the rod having a reduced portion, a threaded portion, a tapped limit collar 24, an adjusting knurled nut 25, and a bracket 23, all as shown in that thermostat and performing the same function, but the thermal blade 97 is grounded therefore the rod need not be insulated, the light tension spring 26 is mounted just above the travel limit rod, which is also the same but has no insulation, in this thermostat. Means for changing the temperature range through which the thermostat is to regulate, is substantially the same as Figure 1 but somewhat differently mounted; the graduated quadrant 145 having a right angle bend portion 145' and a second upward bent portion 145'' which is secured to the insulated block 98; an upward bent indicator lever 146 having a circular flat portion 146' provided with a central hole for frictionally pivoting and securing this indicator lever to the block 98 with the pointer swinging over the graduated quadrant, a spring 31 is also the same as Figure 1 thermostat. The thermal member of this thermostat also consists of two sections, the bi-metal and the blade member, they are separated by non-conducting material for retarding the heat from entering the thermal blade.

The circuit from the thermal blade 97, which is grounded, is, from the thermal screw 6 through lead 132 to the solenoid R and other solenoids 42 of reciprocating step motor regulators, and from the solenoids through leads 133 to the transformer which is grounded; the terminal screw 7 through lead 131 to solenoids L and the 43 solenoids of the other reciprocating step motor regulators and hence through lead 133 to the transformer.

The cam 142 performs the same function that the screw thread shaft 11' does of Figure 1, and it is obvious that a screw thread may be used in this thermostat or that a cam may be used in that thermostat. When a signal is received at terminal screw 6 the solenoid R will be energized and rotate the notched ratchet wheel 134, the cam 142 and the quadrant 112 in the counter-clockwise direction, this will have moved the lower end of the switch arm opening 130 to the left and press the thermal blade and the terminal screw firmly together, at the same time the travel limit arm 143 lower end will have moved to the right and caused the spring to pull somewhat harder on the thermal blade but regardless of how much pull might be present the thermal blade and the terminal screw contact are held firmly together; after the solenoid stroke is completed, the arm 120 will be forced to the left and the opening 130 to the right and the contact of the terminal screw 6 and the thermal blade 97 will be pulled apart which will allow the solenoid plunger R to return to the neutral position and the opening 130 will again be in the normal position with the thermal member free to respond to another signal. When the terminal screw 7 receives a signal from the thermal blade the opposite operations take place which are now easily traced and therefore need no further explaining. The travel limit stop rod will stop movement of the steps in both direction as in the other thermostats as above described, and are also adjustable.

In all the thermostats of this invention, the thermal member relative temperature position is shown changed by spring tension change causing the thermal contact pressure to be changed, during each step, thereby forming steps; in my above mentioned patent applications this method of contact separating, is disclosed, these also are shown with various methods of changing the amount of movement for changing the temperature range within each step; it is therefore obvious that an adjustment for changing the amount of thermal movement may be used on the thermostats of this present invention.

It will be seen that this uniform step producing thermostat is a complete step motor regulator energizer independent of any other outside power source other than a regular electric supply current. In the thermostat just described the thermal two way contact is the only switch mechanism in the whole temperature regulator system, a number of regulators that operate without switches may be operated from this one thermostat; switch-less operated regulators are used throughout, with these thermostats of this current invention.

It is obvious that the mercury single pole double throw switch may be used in the last described thermostat with very few changes, similar to, as has been carried out in the two thermostats of Figures 1 and 5 of the drawings.

Various modifications and changes may be made in this invention by those skilled in the art and therefore am only limited in accordance with the scope of the appended claims.

I claim as my invention:

1. The combination with a temperature regulating system, of uniform step temperature control means adapted to be moved back and forth between predetermined limits constituting a predetermined number of a series of equally spaced step positions, a thermostat comprising power means including supporting means, a rocker pivoted on support means, said power means comprising a pair of electro-magnets for oscillating said rocker swinging on said pivot for moving in opposite directions from a neutral position, a camming switch control member having a neutral position and opposite end positions operatively connected to said rocker, a thermally actuated switch means for making circuit with opposed terminals for operating said power means for moving said camming switch control member to either side of said neutral position for energizing said temperature control means, a switch lock means for locking said thermally actuated switch means in circuit with one of said terminals when one of said electromagnets move said camming member from the neutral position into an end position for operating said temperature control means through one of said equally spaced steps of said predetermined limits, means for returning said camming switch control member back to said neutral position after breaking said thermally actuated switch circuit with either of said terminals, and means operated by said rocker for moving the relative thermal position of said thermally actuated switch means for separating it from either of said terminals during each of said equally spaced step movements effective after said step is complete.

2. The combination with a temperature regulating system, of uniform step temperature control means adapted to be moved back and forth between predetermined limits constituting a predetermined number of a series of equally spaced step positions, a thermostat comprising power means including supporting means, a rocker pivoted on support means, said power means comprising a pair of electro-magnets having closely fitting plungers forming air cushions for retarding said plunger action for oscillating said rocker swinging on said pivot for moving in opposite directions from a neutral position, a circular switch control quadrant having a neutral and opposite end positions operatively connected with said rocker, a thermally actuated switch means for making circuit with opposed terminals for energizing either of said pair of electromagnets for rocking said quadrant to either side of said neutral position and for energizing said temperature control means, a switch lock means for locking said thermally actuated switch means in circuit with either one of said terminals when one of said electro-magnets swings said quadrant from the neutral position into an end position for operating said temperature control means through one of said equally spaced steps of said predetermined limits, means for returning said quadrant back to said neutral position by breaking said thermally actuated switch circuit with said opposed terminals, and propelling ratchet pawl means operating with said rocker, ratchet wheel operated means rotatably mounted and actuated by said propelling pawls by said rocker for moving to separate said thermally actuated switch means from either of said terminals during each of said equally spaced step movements of said temperature control means effective after completion of said equal step.

3. The combination with a temperature regulating system, of uniform step temperature control means adapted to be moved back and forth between predetermined limits constituting a predetermined number of a series of equally spaced step positions, a thermostat comprising power means including supporting means, a rocker pivoted on support means, said power means comprising a pair of electro-magnets having closely fitting plungers forming air cushions for retarding said plunger action for oscillating said rocker swinging on said pivot for moving in opposite directions from a neutral position, a circular switch control quadrant having a neutral and opposite end positions operatively connected with said rocker, a thermally actuated switch means for making circuit with opposed terminals for energizing either of said pair of electro-magnets for rocking said quadrant to either side of said neutral position and for energizing said temperature control means, a switch lock means for locking said thermally actuated switch means in circuit with either one of said terminals when one of said electro-magnets swings said quadrant from the neutral position into an end position for operating said temperature control means through one of said equally spaced steps of said predetermined limits, means for returning said quadrant back to said neutral position by opening connection between thermally actuated switch means and either of said opposed terminals, propelling ratchet pawl means connected with said rocker, ratchet wheel rotatably mounted and actuated by said propelling pawls by said rocker for moving said ratchet wheel, means operated by said wheel for moving to separate said thermally actuated switch means from either of said terminals during each of said equally spaced step movements of said temperature control means effective after completion of said equal step, and travel limit stop means operated by said ratchet wheel for limiting said thermally actuated switch means movement to limit operating of said power means and said temperature control means to equal said predetermined number of a series of equally spaced step positions of said predetermined limits.

4. In a control system, including responsive means, regulating means, power means adapted to move said regulating means back and forth between predetermined limits constituting a predetermined number of a series of equally divided stepped positions, switch means, said switch means contacted by said responsive means, lock means, said responsive switch means to operate said power means to move said lock means for locking said responsive means contact for assuring the operation of said power means and said regulating means through one of said equally divided step positions of said predetermined limits.

5. In a control system, including responsive means, regulating means, power means adapted to move said regulating means back and forth between predetermined limits constituting a predetermined number of a series of equally divided stepped positions, switch means, said switch means contacted by said responsive means, lock means, said responsive switch means to operate said power means to move said lock means for locking said responsive means contact for assuring the operation of said power means and said regulating means through one of said equally divided step positions of said predetermined limits, and means operated by said power means for moving means to move said responsive means relative position for opening said switch means contact.

6. In a control system, including responsive means, regulating means, power means adapted to move said regulating means back and forth between predetermined limits constituting a predetermined number of a series of equally divided stepped positions, switch means, said switch means contacted by said responsive means, lock means, said responsive switch means to operate said power means to move said lock means for locking said responsive means contact for assuring the operation of said power means and said regulating means through one of said equally divided step positions of said predetermined limits, means operated by said power means for moving means to move said responsive means relative position for opening said switch means contact, and means for changing the amount of movement of moving said responsive means relative position for opening said switch means contact without changing the number of said series of equally divided steps or predetermined limits.

7. In a control system, including responsive means, regulating means, power means adapted to move said regulating means back and forth between predetermined limits constituting a predetermined number of a series of equally divided stepped positions, switch means, said switch means contacted by said responsive means, lock means, said responsive switch means to operate said power means to move said lock means for locking said responsive means contact for assuring the operation of said power means and said regulating means through one of said equally divided step positions of said predetermined limits, and travel limit stop means moved by said power means for limiting said responsive means movement for operating said power means and said regulating means to equal that of said predetermined limits and number of equally divided steps.

8. In a control system, including responsive means, regulating means, power means adapted to move said regulating means back and forth between predetermined limits constituting a predetermined number of a series of equally divided stepped positions, switch means, said switch means contacted by said responsive means, lock means, said responsive switch means to operate said power means to move said lock means for locking said responsive means contact for assuring the operation of said power means and said regulating means through one of said equally divided step position of said predetermined limits, travel limit stop means moved by said power means for limiting said responsive means movement for operating said power means and said regulating means to equal that of said predetermined limits and number of equally divided steps, and means for changing said predetermined travel limit and number of said equally divided steps to a different number of such equally divided steps and proportionate travel limit.

9. In a control system, including responsive means, regulating means, power means adapted to move said regulating means back and forth between predetermined limits constituting a predetermined number of a series of equally divided stepped positions, switch means, said switch means contacted by said responsive means, lock means, said responsive switch means to operate said power means to move said lock means for locking said responsive means contact for assuring the operation of said power means and said regulating means through one of said equally divided step positions of said predetermined limits, and spring means operated by said power means to move said responsive means relative position for opening said switch means contact.

10. A control system including power driven regulating means movable between predetermined limits by a predetermined number of equal steps, a control mechanism including a responsive means, switching means mechanically operable by said responsive means, power means controlled by said switch means, operating means for said regulating means operable by said power means, locking means mechanically connected to and operable by said power means for locking said responsive means and said switching means to assure operation of said power means and operate said regulating means through one of said equally spaced steps of said predetermined limits and releasing said responsive means for stopping said power means at completion of said equal steps.

11. A temperature control system including power driven regulating means movable between predetermined limits by a predetermined number of equal steps, a thermostat mechanism including a thermal responsive means, switching means mechanically operable by said thermal responsive means, power means controlled by said switching means, energizing means for said regulating means operable by said power means, locking means mechanically connected to and operable by said power means for locking said thermal responsive means and said switching means to assure operation of said power means through one of said equally spaced steps of said predetermined limits and to release said thermal responsive means and said switching means to stop said power means and said regulating means after said equally spaced step is complete.

12. A temperature control system including power driven regulating means movable between predetermined limits by a predetermined number of equal steps, a thermostatic mechanism including a thermal responsive means, switching means mechanically operable by said thermal responsive means, power means controlled by said switching means, energizing means for said regulating means operable by said power means, locking means mechanically connected to and operable by said power means for locking said thermal responsive means and said switching means to assure operation of said power means and said regulating means through one of said equally spaced steps between said predetermined limits, and movable means operated by said power means for moving to restore said thermal responsive means normal position for opening said switching means at completion of each equally spaced step when said lock means releases said switch means.

13. A temperature control system including power driven regulating means movable between predetermined limits by a predetermined number of equal steps, a thermostatic mechanism including a thermal responsive means, switching means mechanically operable by said thermal responsive means, power means controlled by said switching means, energizing means for said regulating means operable by said power means, locking means mechanically connected to and operable by said power means for locking said thermal responsive means and said switching means to assure operation of said power means and said regulating means through one of said equally spaced steps between said predetermined limits, movable means operated by said power means for moving to restore said thermal responsive means normal position for opening said switching means at completion of each equally spaced step when said lock means releases said switch means, and means for changing the extent of movement for restoring said thermal responsive means normal position without changing said number of equally spaced steps and said predetermined limits.

14. A control system including power driven regulating means movable between predetermined limits of a predetermined number of equal steps, a control mechanism including responsive means, a pair of contacts opposedly contactable by said responsive means, power means controlled by said pair of contacts, energizing means for said regulating means operable by said power means, locking means mechanically connected to and operable by said power means for locking said responsive means with either of said contacts to assure operation of said power means and said regulating means in either direction through one of said equally spaced steps of said predetermined limits and to release said responsive means from either of said contacts to stop said power means when said equally spaced step is complete.

15. A control system including power driven regulating means movable between predetermined limits by a predetermined number of equal steps, a control mechanism including a responsive means, switching means mechanically operable by said responsive means, power means controlled by said switching means, energizing means for said regulating means operable by said power means, a member provided with a neutral position, locking means comprising said member mechanically connected to and operable by said power means for locking said responsive means and said switching means to assure operation of said power means and said regulating means through one of said equally spaced steps of said predetermined limits and said member neutral position to permit restoration of said responsive means normal position for stopping said power means when said step is complete.

16. A control system including power driven regulating means movable between predetermined limits of a predetermined number of equal steps, a control mechanism including a responsive means, opposing contacts contactable by said responsive means, power means controllable by said responsive means and said opposing contacts for reverse operation, energizing means for said regulating means operable by said power means, a circular member provided with a neutral position, locking means comprising said circular member mechanically connected to and operable by said power means for locking said responsive means contact to assure operation of said power means and said regulating means through one of said equally spaced steps of said predetermined limits and said circular member neutral position to permit restoration of said responsive means normal position for stopping said power means when said equal steps are complete.

17. A control system including power driven regulating means movable between predetermined limits of a predetermined number of equal steps, a control mechanism including a responsive means, opposing contacts contactable by said responsive means, power means controllable by said responsive means and said opposing contacts, a circular member provided with engaging positions and with a neutral position for said responsive means released position, said regulating means including step motor operated regulation, energizing means for said step motor operated regulation comprising switch means adjacent said circular member, locking means comprising said circular member mechanically connected to and operable by said power means for locking said responsive means contact to assure operation of said power means through one of said equally spaced steps of said predetermined limits and said engaging means to operate said switch means for energizing said step motor operated regulating means and said neutral position to permit restoration of said responsive means normal position for stopping said power means when said equal step is complete.

18. A control system including power driven regulating means movable between predetermined limits of a predetermined number of equal steps, a control mechanism including a responsive means, switching means mechanically operable by said responsive means, power means controllable by said responsive means and said switch means, a cam member having raised portions and a neutral interruption operable by said power means, locking means including said cam member for locking said responsive means and said switch means for assuring said power means to operate through one of said equally spaced steps of said predetermined limits, said regulating means comprising step motor operated regulation, opposing switch means operable by said cam member raised portion for energizing said step motor regulation during each equally spaced step and said cam means neutral interruption to release said responsive means for stopping said power means when said step is complete.

19. A temperature control system including power driven regulating means movable between predetermined limits by a predetermined number of equal steps, a thermostatic mechanism including a thermal responsive means, switching means mechanically operable by said thermal responsive means, power means controllable by said switching means, a step motor, said regulating means operated by said step motor, energizing means for said step motor operated regulation operable by said power means, locking means mechanically connected to and operable by said power means for locking said thermal responsive means and said switching means to assure operation of said power means and said regulating means through one of said equally spaced steps of said predetermined limits and release said thermal responsive means and said switching means to stop said power means when said equally spaced step is complete.

20. A control system including power driven regulating means movable between predetermined limits by a predetermined number of equal steps, a control mechanism including responsive means, switching means mechanically operable by said responsive means, power means controllable by said switching means, a plurality of step motors, said regulating means operated by said step motors, energizing means for said step motor operated regulators operable by said power means, locking means mechanically connected to and operable by said power means for locking said responsive means and said switching means to assure operation of said power means and said plurality of regulators through one of said equally spaced steps of said predetermined limits and release said responsive means and said switching means to stop said power means after said step is complete.

21. A control system including power driven regulating means movable between predetermined limits by a predetermined number of equal steps, a control mechanism including a responsive means, switching means mechanically operable by said responsive means, power means controllable by said switching means, operating means for said regulating means operable by said power means, locking means mechanically connected to and operable by said power means for locking said responsive means and said switching means to assure operation of said power means and said regulating means through one of said equally spaced steps of said predetermined limits and release said responsive means for stopping said power means when said step is complete, and travel limit stop means moved by said power means for limiting said responsive means movement for operating said power means and said regulating means to equal that of said predetermined limit and number of equal steps.

22. A control system including power driven regulating means movable between predetermined limits by a predetermined number of equal steps, a control mechanism including a responsive means, switching means mechanically operable by said responsive means, power means controllable by said switching means, operating means for said regulating means operable by said power means, locking means mechanically connected to and operable by said power means for locking said responsive means and said switching means to assure operation of said power means and said regulating means through one of said equally spaced steps of said predetermined limits and release said responsive means for stopping said power means when said step is complete, and travel limit means for limiting said responsive means movement for operating said power means and said regulating means to equal that of said predetermined limits and number of equal steps.

LUDWIG HOLLAND-LETZ.